Patented Nov. 6, 1934

1,979,678

UNITED STATES PATENT OFFICE 1,979,678

DISAZO COMPOUNDS FOR THERAPEUTIC USE

Joseph Ebert, Westmont, N. J., assignor to The Farastan Company, Philadelphia, Pa., a corporation of Pennsylvania No Drawing. Application October 15, 1931,
Serial No. 569,120

5 Claims. (Cl. 260—76)

This invention relates to new disazo compounds for therapeutic use. The invention includes the new compounds and therapeutic compositions comprising these new compounds.

The disazotized nucleus of these new compounds is coupled thru one azo group with ortho-hydroxy-quinoline and thru the other azo group with either o-hydroxy-quinoline, an aromatic amine or an aromatic carboxylic acid or carboxylate. The carboxylic acid or carboxylate may be an amino derivative or an hydroxy derivative; it may be an amino-hydroxy derivative or other modified derivative such as a methyl-hydroxy derivative. The amine may be an aromatic diamine or an alkoxy aromatic amine.

The nucleus of the diamino compound from which the disazo compounds of this invention are prepared may be a phenyl residue, a diphenyl residue, or a diphenyl methane residue, hereinafter referred to in the claims as residues of the benzene series. The residue may contain an alkyl group, for example —N=N—C₆H₃—CH₃—N=N— or an alkoxy group, for example —N=N—C₆H₃—OC₂H₅—CH₂—C₆H₃—OC₂H₅—N=N—. The disazo compounds of this invention are non-toxic. They contain no nitro, sulfonic, chlorine, bromine, or iodine groups.

The disazo compounds of this invention possess pronounced bactericidal and bacteriostatic value and have a distinct analgesic action. The bactericidal value is at least 1 to 1500 and the bacteriostatic value is at least 1 to 60,000. The color of the compounds ranges from a brownish red to a dark red. Their alkali metal salts are practically insoluble in water; their hydrochlorides and sulfates are more soluble in water. The low toxicity of these compounds, their colloidal character and their color make them particularly advantageous for use in the treatment of intestinal and genito-urinary disorders. The compounds may be used in the form of their alkali metal salts, their hydrochlorides, their sulfates, or the free bases, all of which are soluble in the common organic solvents such as alcohols and acetone.

The following examples illustrate the invention but it is intended and is to be understood that the invention is not limited to the specific examples given below. In connection with Example 1 the method of preparation is given somewhat in detail. The other examples may be prepared by tetrazotizing one molecular weight of a diamino nucleus and coupling this with two molecular weights of ortho-hydroxy-quinoline or one molecular weight of ortho-hydroxy-quinoline and one molecular weight of a proper carboxylic acid or aromatic amine. The compounds thus obtained as salts may be purified and the hydrochlorides or sulfates or the free bases may be formed from the salts in the manner well-known in the art.

EXAMPLE 1

Sodium salt of diphenyl-disazo-o-hydroxy-quinoline-o-amino-benzoic acid

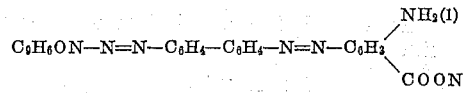

18.6 parts by weight of benzidine are heated with 80 parts of concentrated hydrochloric acid (or the corresponding amount of benzidine hydrochloride may be used) and dissolved or suspended in approximately 250 parts of water. This solution is tetrazotized at a temperature of substantially 15° C. with a solution of 14.2 parts of sodium nitrite in 60 parts of water. This diazonium compound is then coupled with a solution of 14.6 parts of o-hydroxy-quinoline in 15 to 20 parts of concentrated hydrochloric acid and 150 parts of water mixed with a solution of 14 parts of o-amino-benzoic acid in 12 parts of concentrated hydrochloric acid and 100 parts of water. The coupling is carried out at a temperature of 15° to 25° C. The mixture is then made alkaline by the addition of a 10 to 20% solution of sodium hydroxide. The sodium salt separates out as a reddish-brown precipitate. This precipitate is filtered out and washed with water until free from chloride and then dried. The sodium salt may be purified by recrystallizing it from alcohol.

EXAMPLE 2

Sodium salt of diphenyl-disazo-o-hydroxy-quinoline-o-hydroxy-benzoic acid

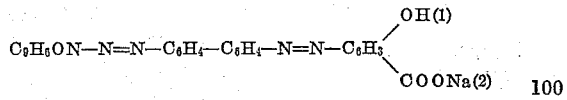

Prepared from benzidine, o-hydroxy-quinoline and salicylic acid.

EXAMPLE 3

Sodium salt of toluene-disazo-o-hydroxy-quinoline-5-amino-hydroxy-benzoic acid

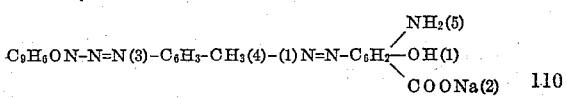

Prepared from m-toluylenediamine, o-hydroxy-quinoline and 5-amino-hydroxy-benzoic acid.

Example 4

*Diphenyl-disazo-diamino - benzene - o - hydroxy-quinoline*

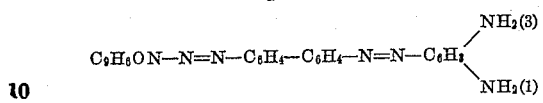

Prepared from benzidine, m-phenylene-diamine and o-hydroxy-quinoline.

Example 5

*Diphenyl - disazo-o-amino-ethoxy phenol-o-hydroxy-quinoline*

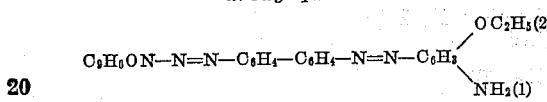

Prepared from benzidine, o-phenetidine and o-hydroxy-quinoline.

Example 6

*Ditolyl-disazo-o-amino-methoxy phenol - o - hydroxyquinoline*

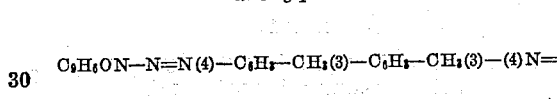

Prepared from o-tolidine, o-anisidine and o-hydroxy-quinoline.

Example 7

*Benzene-disazo-m-phenylene diamine-o-hydroxy-quinoline*

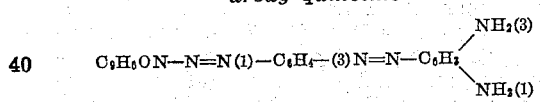

Prepared from m-phenylene diamine, m-phenylene diamine and o-hydroxy-quinoline.

Example 8

*Diphenyl-disazo-bis-o-hydroxy-quinoline*

Prepared from benzidine and o-hydroxy-quinoline (2 mol.)

Example 9

*Sodium salt of diphenyl-disazo-o-hydroxy-quinoline-5-amino-hydroxybenzoic acid*

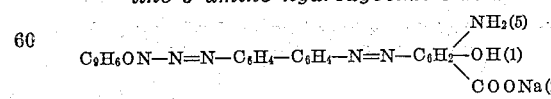

Prepared from benzidine, o-hydroxy-quinoline and 5-amino-hydroxy benzoic acid.

Example 10

*Sodium salt of benzene-disazo-o-hydroxy-quinoline-o-amino benzoic acid*

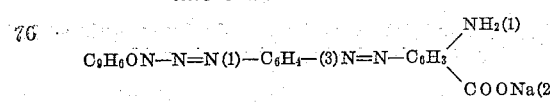

Prepared from m-phenylene diamine, o-hydroxy-quinoline and o-amino benzoic acid.

Example 11

*Sodium salt of benzene-disazo-o-hydroxy-quinoline-o-hydroxy benzoic acid*

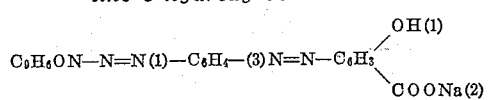

Prepared from m-phenylene diamine, o-hydroxy-quinoline and o-hydroxy benzoic acid.

Example 12

*Benzene - disazo - o - amino - ethoxy phenol - o - hydroxy-quinoline*

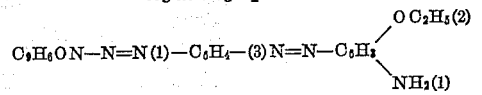

Prepared from m-phenylene diamine, o-phenetidine and o-hydroxy quinoline.

Example 13

*Diphenyl methane - disazo - bis - o - hydroxy-quinoline*

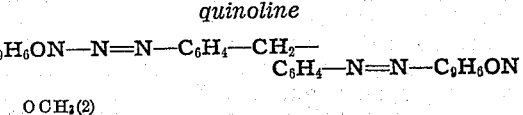

Prepared from p-p'-diamino diphenyl methane, and o-hydroxy-quinoline (2 mol.).

Example 14

*Sodium salt of diphenyl methane-diethoxy-disazo-o-hydroxy-quinoline-o-amino benzoic acid*

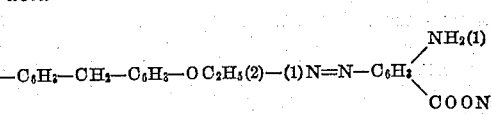

Prepared from diamino-diethoxy-diphenyl methane-o-hydroxy-quinoline and o-amino benzoic acid.

Example 15

*Sodium salt of diphenyl-disazo-o-hydroxy-quinoline-p-hydroxymetatoluic acid*

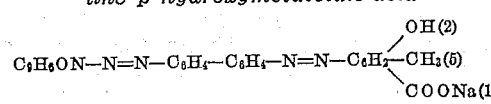

Prepared from benzidine, o-hydroxy-quinoline and p-cresotic acid.

In the claims, the group $C_9H_6ON$ indicates an hydroxy quinoline radical in which the nitrogen and OH groups are in different rings as in a derivative of o-hydroxy-quinoline.

I claim:

1. A non-toxic disazo compound having the general formula $R'—N=N—R—N=N—C_9H_6ON$ where $—N=N—R—N=N—$ is a disazotized nucleus of the benzene series and R' is o-hydroxy-quinoline, an aromatic diamine of the benzene series, an alkoxy aromatic amine of the benzene series, an amino carboxylic acid or carboxylate of the benzene series, or an hydroxy carboxylic acid or carboxylate of the benzene series.

2. A non-toxic disazo compound having the general formula $R'—N=N—R—N=N—C_9H_6ON$ where R is a phenyl residue and R' is an aromatic diamine of the benzene series.

3. A non-toxic disazo compound which is brown to red in color, has the general formula R'—N=N—R—N=N—C$_9$H$_6$ON, where R is a phenyl residue, a diphenyl residue or a diphenyl methane residue, R' is o-hydroxy-quinoline, an aromatic diamine of the benzene series, an alkoxy aromatic amine of the benzene series, an amino carboxylic acid or carboxylate of the benzene series, or an hydroxy carboxylic acid or carboxylate of the benzene series and has a bactericidal value of at least 1 to 1500 and a bacteriostatic value of at least 1 to 60,000.

4. Sodium salt of diphenyl-disazo-o-hydroxy-quinoline-o-amino-benzoic acid.

5. Sodium salt of toluene-disazo-o-hydroxy-quinoline-5-amino-hydroxy-benzoic acid.

JOSEPH EBERT.